(No Model.)

T. B. JEFFERY.
WHEEL RIM AND TIRE.

No. 551,035. Patented Dec. 10, 1895.

Witnesses.

Inventor
Thomas B. Jeffery
by Walter H. Chamberlin
Atty.

UNITED STATES PATENT OFFICE.

THOMAS B. JEFFERY, OF CHICAGO, ILLINOIS.

WHEEL RIM AND TIRE.

SPECIFICATION forming part of Letters Patent No. 551,035, dated December 10, 1895.

Application filed May 15, 1895. Serial No. 549,348. (No model.)

*To all whom it may concern:*

Be it known that I, THOMAS B. JEFFERY, a citizen of the United States, residing at Chicago, county of Cook, State of Illinois, have invented a certain new and useful Improvement in Wheel Rims and Tires; and I declare the following to be a full, clear, and exact description of the invention, such as will enable others skilled in the art to which it pertains to make and use the same, reference being had to the accompanying drawings, which form a part of this specification.

My invention has for its object certain improvements in connection, more particularly, with non-metallic rims for bicycle and other vehicle wheels, where a pneumatic flexible tire is engaged with the wood rim by what is known as the "clincher" engagement—that is, where the edges of the rim are hooked and are engaged by flanges on the sheath of the tire.

The invention consists in a combination of devices and appliances hereinafter described and claimed.

Figure 1:
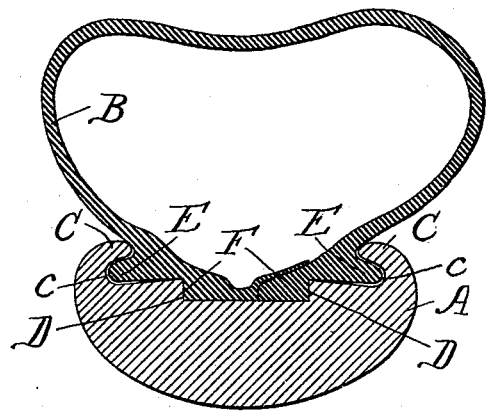
Figure 2:
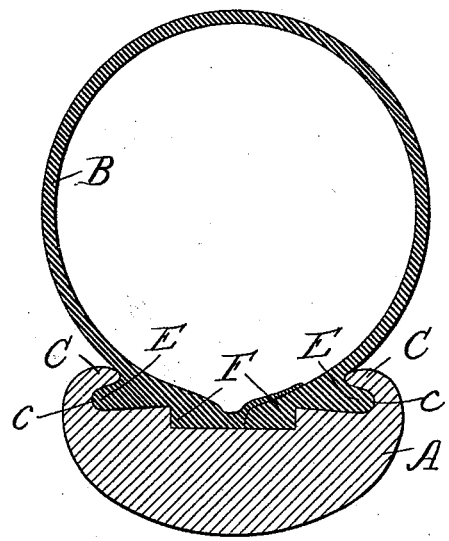

In the drawings, Figure 1 is a cross-section view of the rim and tire, showing the tire deflated. Fig. 2 is a cross-section showing the tire inflated.

In carrying out the invention A represents the non-metallic rim, and B the tire-sheath of the tire. The rim is provided with the usual overhanging or hooked edge C and with an additional flange or ridge D within the outer edge. The sheath is provided with a rib E, which engages under the outer hooked edge C, and with the ridge F, which bears against the rim-ridge D.

I will now explain particularly my improvement.

It is of course obvious that the ridge D and its corresponding ridge F on the sheath are for the purpose of relieving the bursting strain which is put upon the flange or hook edge C of the rim by dividing the force and carrying part of it at least at a point on the rim (the flange D) where the rim is thicker and better able to carry the strain; but in practice it has been found that if the sheath when in its deflated condition has both the flange E and the flange F bearing against their respective flanges C and D on the rim then when the tire is inflated or after being inflated the weight of the rider is thrown upon it the material composing the sheath E will stretch and, that portion of the material between the ridges E and F giving slightly, will allow the entire strain to come upon the flanges C, or, if not the entire strain, then enough of it to sometimes split the rim at this point. In order to obviate this, I so construct the sheath and locate the ridges E F thereon in such relative position that when the tire is deflated the rib F will bear against the ridge; D but the rib E will not have a firm bearing against the edge c, (shown in Fig. 1;) but when the tire is inflated the stretch of the material will bring the rib E against the flange C and the strain due to the free expansible edges of the tire will be thereby equally distributed between the two flanges, or, if it is not equally distributed, the flange D, which is better able to stand the strain, will carry the heaviest part thereof.

It is of course obvious that the form of the device may be changed in more or less respects without departing from the spirit of my invention, which consists, essentially, in the provision of a ridge within the outer hooked edge of the rim, against which the sheath can bear, and the sheath so constructed that when inflated or the strain put thereon it will bear first against the inner ridge and later against the ridge forming the hooked edge.

What I claim is—

The combination with the rim provided on each edge with two abutting flanges or ridges of the tire, also provided on each edge with two corresponding abutting ribs or flanges, the distance between the two tire ribs when the tire is deflated being less than the distance between the two corresponding rim flanges whereby when the tire is inflated a bearing is first established between the inner ribs and later between the outer ribs, substantially as described.

In testimony whereof I sign this specification in the presence of two witnesses.

THOS. B. JEFFERY.

Witnesses:
W. H. CHAMBERLIN,
FLORENCE EMBREY.